(12) United States Patent
Hiekata

(10) Patent No.: US 10,565,690 B2
(45) Date of Patent: Feb. 18, 2020

(54) EXTERNAL INTERFERENCE REMOVAL DEVICE

(71) Applicants: Kobe Steel, Ltd., Kobe-shi (JP); KOBELCO CONSTRUCTION MACHINERY CO., LTD., Hiroshima-shi (JP)

(72) Inventor: Takashi Hiekata, Kobe (JP)

(73) Assignees: Kobe Steel, Ltd., Kobe-shi (JP); KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 0 days.

(21) Appl. No.: 16/080,456

(22) PCT Filed: Feb. 10, 2017

(86) PCT No.: PCT/JP2017/004839
§ 371 (c)(1),
(2) Date: Aug. 28, 2018

(87) PCT Pub. No.: WO2017/150136
PCT Pub. Date: Sep. 8, 2017

(65) Prior Publication Data
US 2019/0066270 A1 Feb. 28, 2019

(30) Foreign Application Priority Data
Mar. 2, 2016 (JP) .................................. 2016-040046

(51) Int. Cl.
*G06T 5/00* (2006.01)
*E02F 3/43* (2006.01)
(Continued)

(52) U.S. Cl.
CPC ................ *G06T 5/002* (2013.01); *E02F 3/43* (2013.01); *E02F 9/24* (2013.01); *E02F 9/265* (2013.01); *G06T 7/215* (2017.01)

(58) Field of Classification Search
CPC .. G06T 5/002; G06T 7/215; E02F 3/43; E02F 9/24; E02F 9/265
See application file for complete search history.

(56) References Cited

U.S. PATENT DOCUMENTS

2009/0161914 A1* 6/2009 Song .................... G01N 21/538
382/106
2010/0079590 A1* 4/2010 Kuehnle ............ G06K 9/00798
348/118
(Continued)

FOREIGN PATENT DOCUMENTS

JP 2001-64992 A 3/2001
JP 2007-226604 A 9/2007
(Continued)

OTHER PUBLICATIONS

International Search Report dated May 9, 2017, in PCT/JP2017/004839, filed Feb. 10, 2017.
(Continued)

*Primary Examiner* — Behrang Badii
*Assistant Examiner* — Daniel L Greene
(74) *Attorney, Agent, or Firm* — Oblon, McClelland, Maier & Neustadt, L.L.P.

(57) ABSTRACT

An extraction unit extracts, as a candidate pixel of a disturbance object, a predetermined number of pixels in order of smaller distance from each distance image acquired by a distance measurement sensor, the predetermined number being one or more. A calculation unit calculates a feature value indicating a characteristic of temporal change between each candidate pixel in a distance image of a current frame and a corresponding candidate pixel in a distance image of
(Continued)

a past frame. A removal unit specifies, as a pixel indicating a disturbance object, a candidate pixel the feature value of which calculated by the calculation unit is larger than a predetermined reference feature value, and removes the specified pixel from the distance image of the current frame.

11 Claims, 5 Drawing Sheets

(51) Int. Cl.
  *G06T 7/215* (2017.01)
  *E02F 9/24* (2006.01)
  *E02F 9/26* (2006.01)

(56) References Cited

U.S. PATENT DOCUMENTS

| | | | |
|---|---|---|---|
| 2010/0141806 A1 | 6/2010 | Uemura et al. | |
| 2012/0050074 A1* | 3/2012 | Bechtel | B60R 1/04 340/988 |
| 2012/0169842 A1* | 7/2012 | Chuang | G08B 13/19619 348/39 |
| 2015/0312498 A1 | 10/2015 | Kawano | |
| 2016/0001701 A1* | 1/2016 | Pagliani | G01S 13/865 701/36 |
| 2017/0107698 A1* | 4/2017 | Yamaguchi | H04N 7/181 |

FOREIGN PATENT DOCUMENTS

| | | |
|---|---|---|
| JP | 2011-16421 A | 1/2011 |
| JP | 2015-210702 A | 11/2015 |

OTHER PUBLICATIONS

Extended European Search Report Issued in European Application No. 17759607.9 dated Oct. 9, 2019.

* cited by examiner

EXTERNAL INTERFERENCE REMOVAL DEVICE

TECHNICAL FIELD

The present invention relates to a technique for removing a disturbance object included in a distance image measured by a distance measurement sensor.

BACKGROUND ART

For example, in a construction machine such as a hydraulic excavator or a hydraulic crane, in order to prevent a work machine such as a boom or an attachment from interfering with a main body of the construction machine, a measure is taken of preventing the work machine from interfering with the main body by installing a distance measurement sensor onto the main body and sensing the distance between the main body and the work machine.

For example, Patent Literature 1 discloses an interference prevention device that uses a plurality of ultrasonic sensors to determine whether or not a bucket has entered an interference risk area set at the front of a cab.

However, with regard to interference prevention devices provided with distance measurement sensors, there is a problem such that a granular disturbance object, such as a rain drop or a snow particle, flying near a construction machine during rain or snow is erroneously detected as a work machine or a person approaching a main body, and the operator's work is interrupted due to an unnecessary warning being issued to the operator or the work machine being automatically stopped.

Further, Patent Literature 1 does not give any consideration to disturbance objects, and thus a situation in which a disturbance object is erroneously detected as a work machine cannot be prevented in Patent Literature 1.

CITATION LIST

Patent Literature

Patent Literature 1: JP 2001-64992 A

SUMMARY OF INVENTION

An object of the present invention is to provide a disturbance removal device that removes a disturbance object that becomes unnecessary when recognizing a target object in a distance image.

A disturbance removal device according to one aspect to the present invention is a disturbance removal device that removes, from a distance image, a granular disturbance object flying around a target object to be recognized, the disturbance removal device including: a distance measurement sensor that chronologically acquires a plurality of distance images indicating a distance distribution of a surrounding environment;
an extraction unit that, with respect to each distance image acquired by the distance measurement sensor, extracts a predetermined number of pixels in order of smaller distance as candidate pixels of the disturbance object, the predetermined number being one or more; a calculation unit that calculates a feature value the value of which increases with a greater degree of temporal change between each candidate pixel in a distance image of a current frame and a corresponding candidate pixel in a distance image of a past frame; and a removal unit that specifies, as a pixel indicating the disturbance object, a candidate pixel the feature value of which calculated by the calculation unit is larger than a predetermined reference feature value, and removes the specified pixel from the distance image of the current frame.

According to this configuration, a disturbance object located closer to the distance sensor than the target object is can be prevented from being erroneously detected as the target object.

DESCRIPTION OF EMBODIMENTS

[Basic Structure]

Figure 1:
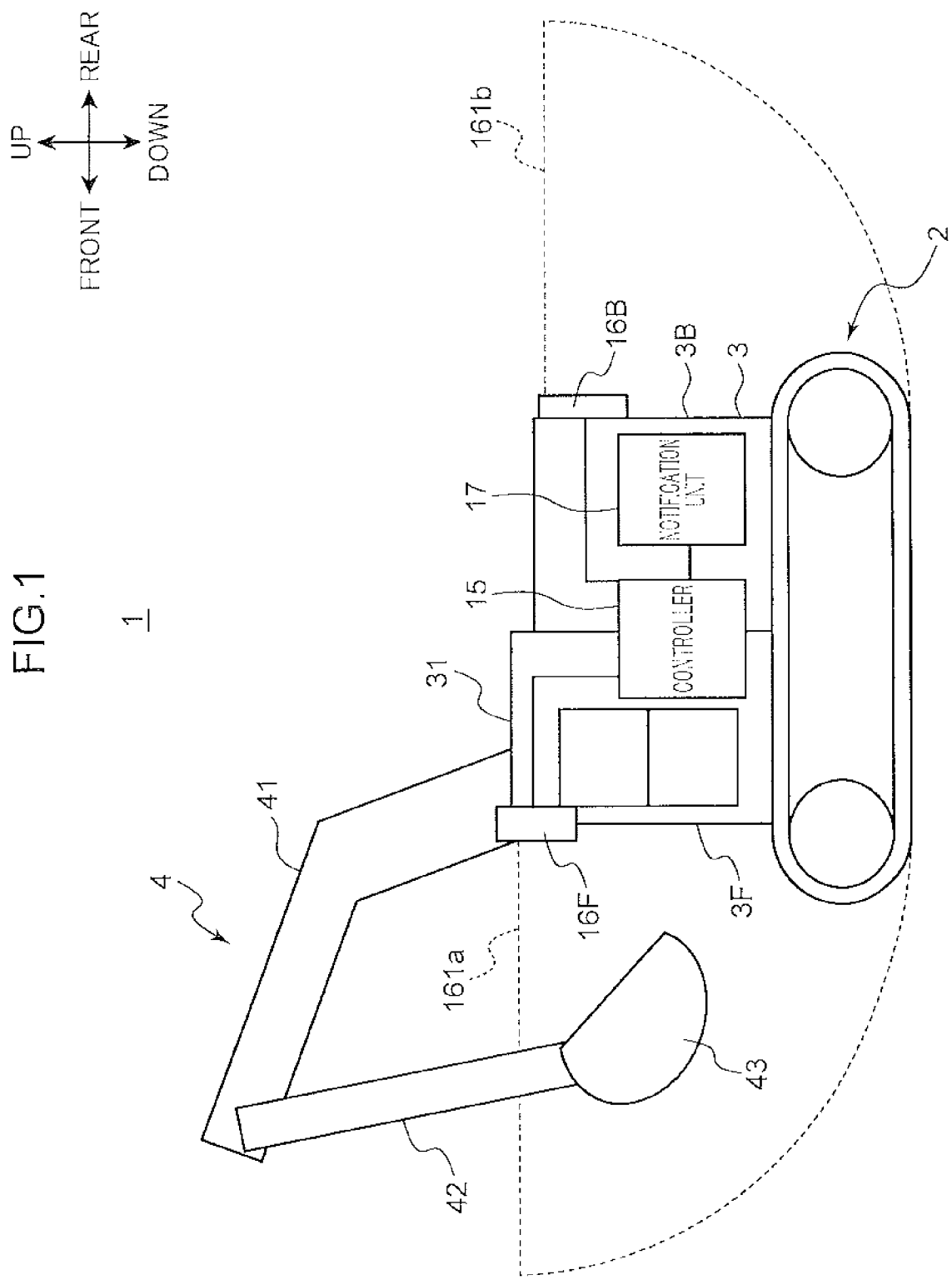
FIG. 1 is a diagram illustrating one example of a construction machine to which a disturbance removal device according to an embodiment of the present invention is applied.

FIG. 1 is a diagram illustrating one example of a construction machine 1 to which a disturbance removal device according to an embodiment of the present invention is applied. Here, description is provided while taking a hydraulic excavator for example as the construction machine 1, but this is one example. Any construction machine may be used as long as the construction machine is a construction machine, such as a hydraulic crane, a work machine of which, such as a boom, may interfere with a main body part of the construction machine, or a construction machine that may interfere with people in the surroundings. Other than construction machines, the disturbance removal device may be applied to machines, such as human-type robots and welding robots, having moving parts that may interfere with people, or automobiles having a possibility of interfering with people.

The construction machine 1 illustrated in FIG. 1 includes: a crawler-type lower travelling body 2; an upper slewing body 3 provided on the lower travelling body 2 to be slewable; and a work machine 4 installed onto the upper slewing body 3. The lower travelling body 2 and the upper slewing body 3 constitute a main body part of the construction machine 1.

In the present specification, the direction in which the lower travelling body 2 advances is referred to as the front, the direction in which the lower travelling body 2 retreats is referred to as the rear, and the term "front-rear direction" is used to refer to the front and rear directions collectively. Further, the left-side direction when the lower travelling body 2 is seen from the rear toward the front is referred to as the left, the right-side direction when the lower travelling body 2 is seen from the rear toward the front is referred to as the right, and the term "left-right direction" is used to refer to the left and right directions collectively. Further, the upper-side direction of the construction machine 1 is referred to as up, the lower-side direction of the construction machine 1 is referred to as down, and the term "up-down direction" is used to refer to the up and down directions collectively. Note that in FIG. 1, the construction machine 1 when seen from the left toward the right is illustrated.

The work machine 4 includes: a boom 41 derrickably installed with respect to the upper slewing body 3; an arm 42 swingably installed with respect to the tip part of the boom 41; and an attachment 43 swingably installed with respect to the tip part of the arm 42. The boom 41, the arm 42, and the attachment 43 are driven in derricking or swinging manner by hydraulic cylinders corresponding thereto (not illustrated). In FIG. 1, an excavation bucket for example is used as the attachment 43, but this is one example.

The upper slewing body 3 is provided with: a cabin 31 that the operator boards; a controller 15 having overall control over the construction machine 1; and a notification unit 17 for notifying the operator of the state of the construction machine 1.

The upper slowing body 3 has a distance measurement sensor 16F and a distance measurement sensor 16B disposed at the upper end of a front face 3F and the upper end of a rear face 3B, respectively. The distance measurement sensors 16F, 16B are capable of directly measuring the distance of objects (for example, a person in the rear, the work machine 4 in the front, etc.) in the vicinity of the upper slewing body 3.

The distance measurement sensors 16F, 16B are constituted of a depth sensor or a stereo camera, for example, and chronologically acquire a plurality of distance images indicating distance distributions to surrounding objects, at a predetermined frame rate (for example, around 5 to 50 fps).

As the depth sensor, a Time-of-Flight (TOF) distance measurement sensor can be used, for example. The TOF sensor measures distance distributions of the surrounding environment by measuring, by using an infrared camera, the time required for radiated infrared light to return by being reflected by objects. The stereo camera, for example, is a distance measurement sensor that measures the distance distributions of the surrounding environment by calculating the parallax between corresponding points in a plurality of images taken by using a plurality of cameras.

The distance measurement sensor 16F is installed onto the front face 3B so that at least the front face 3F and the entirety of the front face of the lower travelling body 2 are included in a measurement area 161a. Thus, the distance measurement sensor 16F is capable of detecting the work machine 4 and people located in front of the upper slewing body 3 and the lower travelling body 2.

The distance measurement sensor 16B is installed onto the rear lace 3B so that at least the rear face 3B and the entirety of the rear face of the lower travelling body 2 are included in a measurement area 161b. Thus, the distance measurement sensor 16B is capable of detecting people located behind the upper slewing body 3 and the lower travelling body 2. In the following, the distance measurement sensors 16F and 16B are referred to as distance measurement sensors 16 when no distinction is made therebetween.

The distance images acquired by the distance measurement sensors 16 are fetched by the controller 15, are subjected to the later-described processing, have disturbance objects removed therefrom, and are used for the prevention of interference.

Figure 2:
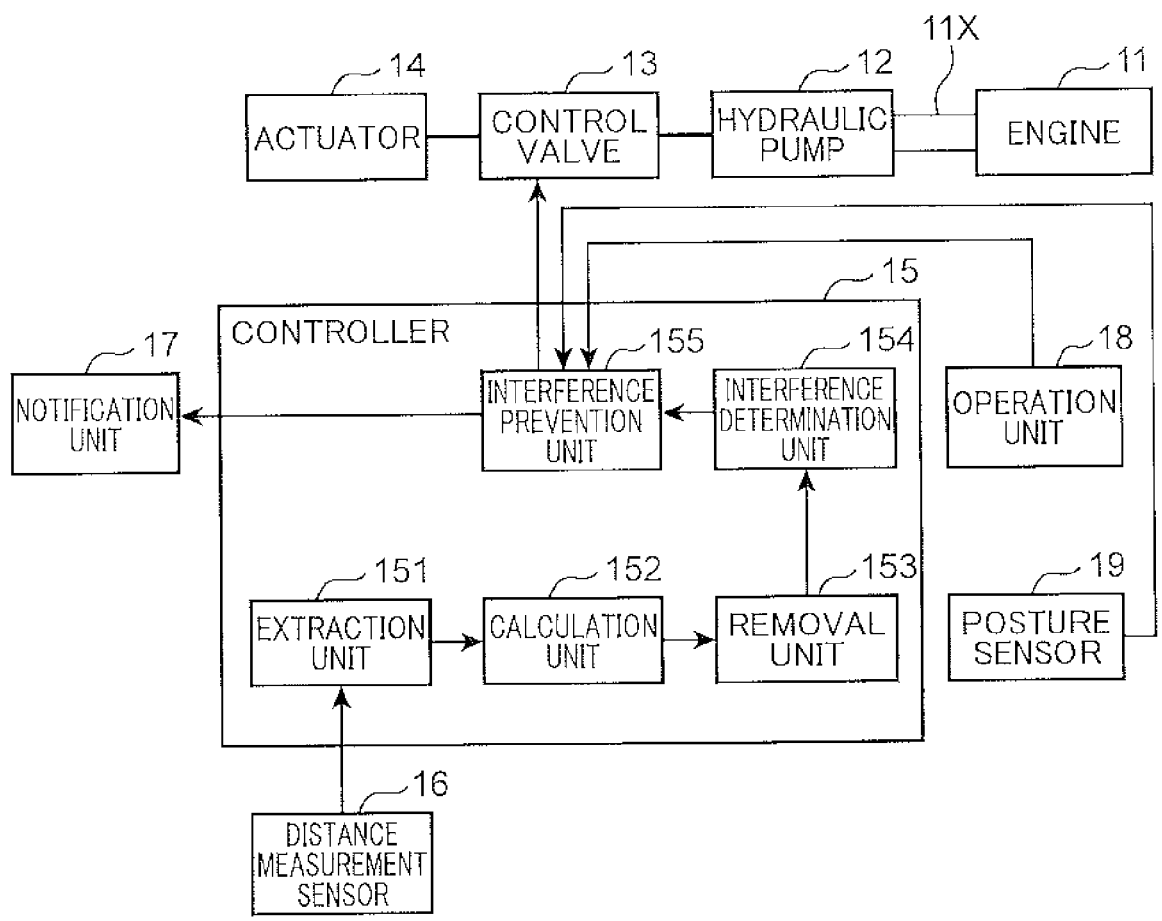
FIG. 2 is a block diagram illustrating an internal configuration of the construction machine illustrated in FIG. 1.

FIG. 2 is a block diagram illustrating an internal configuration of the construction machine 1 illustrated in FIG. 1. In addition to the distance measurement sensors 16, the notification unit 17, and the controller 15, which are illustrated in FIG. 1, the construction machine 1 includes: an engine 11; a hydraulic pump 12; control valves 13; actuators 14; an operation unit 18; and posture sensors 19. Note that in FIG. 2, hydraulic oil flow is indicated by thick lines and control signal flow is indicated by thin lines. Further, the distance measurement sensors 16 and the controller 15 in FIG. 1 serve as constituent elements of the disturbance removal device according to the embodiment of the present invention.

For example, the engine 11 is constituted of a diesel engine. The hydraulic pump 12 is connected to a drive shaft 11X of the engine 11, is driven by the power of the engine 11, and discharges hydraulic oil.

For example, the control valves 13 include: a hydraulic pilot selector valve interposed between the hydraulic pump 12 and the actuators 14; and an electromagnetic valve that adjusts the pilot pressure to be input to the hydraulic pilot selector valve. Under control by the controller 15, the control valves 13 adjust the amount of hydraulic oil supplied from the hydraulic pump 12 to the actuators 14 to operate the actuators 14.

For example, the actuators 14 are constituted of: boom cylinders that cause the boom 41 to derrick with respect to the lower travelling body; an arm cylinder that causes the arm 42 to swing with respect to the boom 41; and an attachment cylinder that causes the attachment 43 to swing with respect to the arm 42. Here, cylinders are used as the actuators 14, but this is one example. A travel motor allowing the lower travelling body 2 to travel and a slew motor allowing the upper slewing body 3 to slew may be used as the actuators 14.

For example, the controller 15 is constituted of a microcomputer including a CPU, a ROM, a RAM, etc., and has control over the entirety of the construction machine 1. In the present embodiment, the controller 15 includes an extraction unit 151, a calculation unit 152, a removal unit 153, an interference determination unit 154, and an interference prevention unit 155. For example, the units from the extraction unit 151 to the interference prevention unit 155 are realized by the CPU executing a program.

With respect to each distance image acquired by the distance measurement sensors 16, the extraction unit 151 performs extraction of a predetermined number of pixels in the order of smaller distance as candidate pixels of disturbance objects, the predetermined number being one or more. Here, a value of around ten is used as the predetermined number, for example, but this is one example. It suffices to use a reasonable value in view of the processing capacity of the controller 15.

The calculation unit 152 calculates a feature value indicating the characteristic of the temporal change between each candidate pixel in a distance image of a current frame and a corresponding candidate pixel in a distance image of a past frame. The feature values are described in detail later.

The removal unit 153 specifies, as a pixel indicating a disturbance object, a candidate pixel the feature value for which having been calculated by the calculation unit 152 is larger than a predetermined reference feature value, and removes the specified pixel from the distance image of the current frame.

In the present embodiment, granular minute objects flying through the air, such as rain drops, snow, sleet, hail, and small insects such as flies and mosquitoes, are taken into consideration as disturbance objects. Such minute objects are characterized for having a greater change in velocity, acceleration, and movement direction compared to the target objects to be recognized (i.e., people and the work machine 4). Accordingly, it is possible to accurately remove only disturbance objects from distance images while keeping the target objects in the distance images by calculating feature values indicating the characteristics of temporal changes of candidate pixels and removing candidate pixels the feature values of which are larger than the reference feature value.

The interference determination unit 154 determines the risk of interference by using distance images from which pixels indicating disturbance objects (referred to in the following as "disturbance pixels") have been removed by the removal unit 153. Here, the interference determination unit 154 recognizes people around the construction machine 1 and the tip part of the work machine 4 in a distance image from which disturbance pixels have been removed. Further, the interference determination unit 154 determines that there is a risk of interference when a person or the tip part of the work machine 4 having been recognized has entered an interference prevention area that is set in advance with respect to the construction machine 1. For example, an area within a predetermined distance range from the lateral walls of the lower travelling body 2 and the upper slewing body 3 can be used as the interference prevention area.

The tip part of the work machine 4 corresponds to the tip of the attachment 43 when the tip of the attachment 43 is located further toward the cabin 31-side than the tip of the arm 42 is, and corresponds to the tip of the arm 42 when the tip of the arm 42 is located further toward the cabin 31-side than the tip of the attachment 43 is. Further, when the work machine 4 is gripping a dismantled object and the dismantled object is located further toward the cabin 31-side than the tip of the attachment 43 and the tip of the arm 42 are, the interference determination unit 154 may determine that there is a risk of interference when the dismantled object has entered the interference prevention area.

The interference prevention unit 155 provides the operator with a warning by using the notification unit 17 when the interference determination unit 154 has determined that there is a risk of interference.

Further, the interference prevention unit 155, while monitoring the data measured by the posture sensors 19, outputs control signals to the control valves 13 so that the work machine 4 takes on a posture in accordance with the operation amount of the operation unit 18. Here, when the interference determination unit 154 has determined that there is a risk of interference, the interference prevention unit 155 outputs control signals for automatically stopping the work machine 4 to the control valves 13, regardless of the operation amount of the operation unit 18. Here, the interference prevention unit 155 may automatically stop the work machine 4 when a person or the work machine 4 has entered an automatic stop area that is smaller than the interference prevention area.

The notification unit 17 is constituted of a display device and a speaker, and notifies the operator of the risk of interference. Here, the notification unit 17 may output a voice message or a warning sound for notifying the risk of interference to the speaker, or may display a message or a warning lamp for notifying the risk of interference on the display device.

For example, the operation unit 18 is constituted of an operation lever for receiving operations for changing the posture of the work machine 4, and outputs an operation amount that is in accordance with the tilt amount of the operation lever to the controller 15.

The posture sensors 19 are constituted of: an angle sensor that detects the derricking angle of the boom 41; an angle sensor that detects the swinging angle of the arm 42; and an angle sensor that detects the swinging angle of the attachment 43, and outputs the measurement data detected by these angle sensors to the controller 15 as measurement data indicating the posture of the work machine 4.

[Flowchart]

Figure 3:
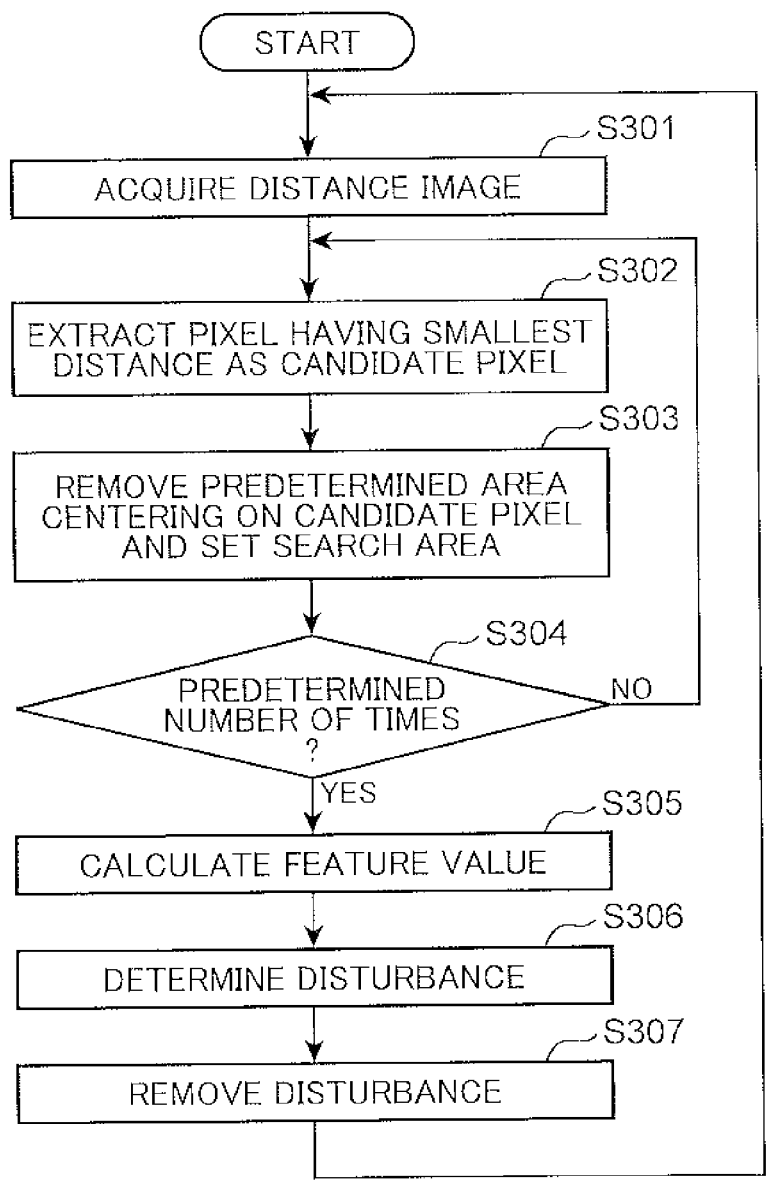
FIG. 3 is a flowchart illustrating one example of processing by the disturbance removal device according to the embodiment of the present invention.

FIG. 3 is a flowchart illustrating one example of processing by the disturbance removal device according to the embodiment of the present invention. This flowchart begins, for example, when the construction machine 1 starts operation, or that is, when the engine 11 is started up.

First, the distance measurement sensors 16 acquire a distance image F(n) of a current frame, and output the distance image F(n) to the extraction unit 151 (S301). At this time, the extraction unit 151 may perform, as pre-processing with respect to the distance image F(n), filter processing in which a smoothing filter is used, and thereby remove high-frequency noise included in the distance image F(n). Here, n is an index defining a frame number of a distance image F, and is a positive integer that increases as time elapses.

Next, the extraction unit 151 extracts, as a candidate pixel, a pixel having the smallest distance (depth component) within a search area set in the distance image (S302). This pixel becomes one disturbance pixel candidate (a candidate of a pixel indicating a disturbance object such as a rain drop).

Next, the extraction unit 151 sets, as the search area, the remainder of the distance image F(n) when excluding a predetermined area centering on the candidate pixel (S303).

Next, the extraction unit 151 returns the processing to S302 and executes the processing from S302 to S304 when the processing of extracting a candidate pixel has not been executed a predetermined number of times (NO in S304). Meanwhile, the extraction unit 151 advances the processing to S305 when the processing of extracting a candidate pixel has been executed the predetermined number of times (YES in S304). The number of disturbance objects, such as rain drops, snow, and insects, appearing on a distance image is not necessarily one. In view of this, in the present embodiment, the processing from S302 to S304 is executed the predetermined number of times in order to extract the predetermined number of candidate pixels.

Figure 4:
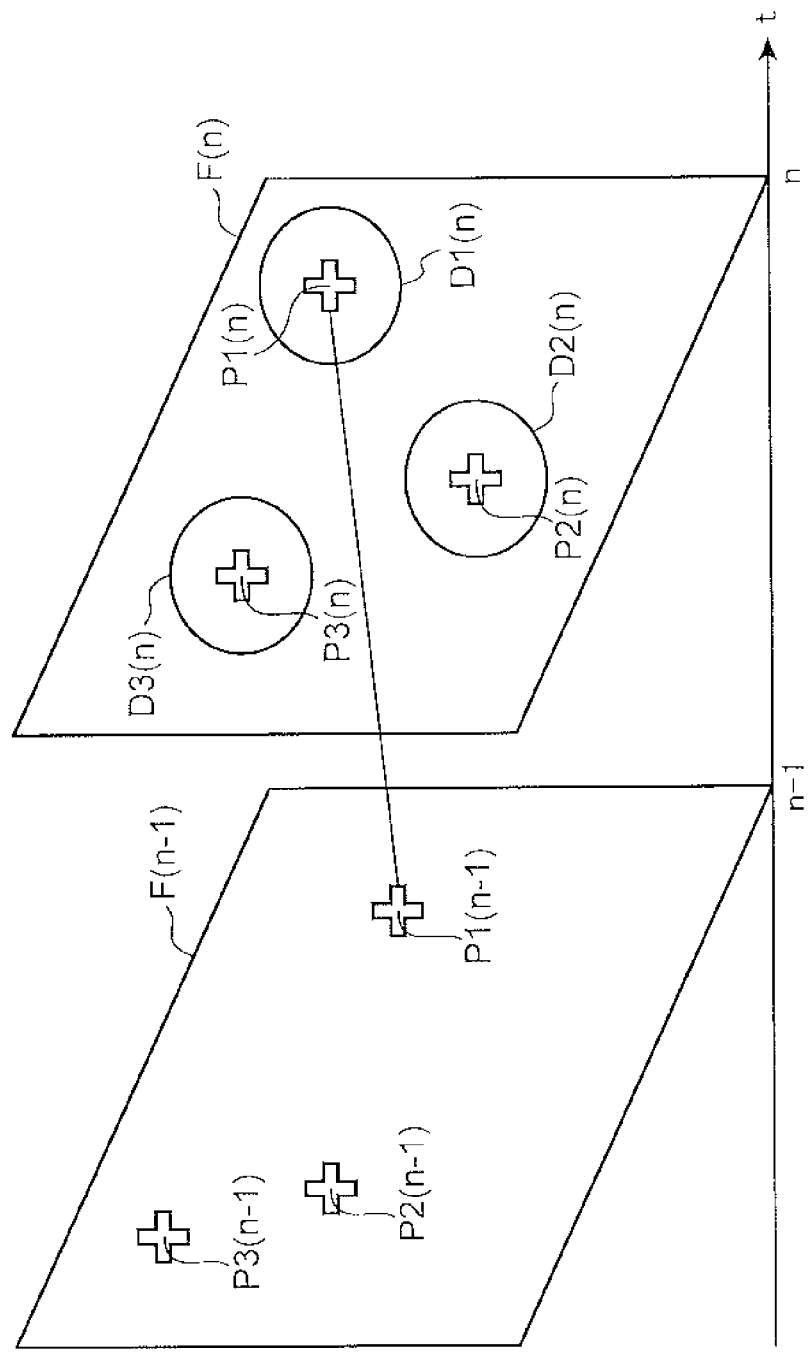
FIG. 4 is a schematic diagram illustrating an example of a search for candidate pixels.

FIG. 4 is a schematic diagram illustrating an example of a search for candidate pixels. First, the extraction unit 151 sets the entirety of the distance image F(n) as the search area, and extracts the pixel having the smallest distance in this search area as a candidate pixel P1(n). Next, the extraction unit 151 sets, as the search area, an area yielded by removing, from the distance image F(n), an area D1(n) having a predetermined radius from the candidate pixel P1(n), and extracts the pixel having the smallest distance in this search area as a candidate pixel P2(n). Next, the extraction unit 151 sets, as the search area, an area yielded by removing, from the distance image F(n), the area D1(n) and an area D2(n) having the predetermined radius from the candidate pixel P2(n), and extracts the pixel having the smallest distance in this search area as a candidate pixel P3(n).

In this manner, the extraction unit 151 extracts the predetermined number of candidate pixels by repeating, with respect to the distance image F(n) for the predetermined number of times, the processing of setting search areas by removing predetermined areas D1(n), D2(n), D3(n) including extracted candidate pixels and extracting the pixels having the smallest distance from within the search areas having been set.

There is a risk that a pixel included within a predetermined area from a candidate pixel may receive reflected light from the same disturbance object as the candidate pixel. In view of this, an area excluding a predetermined area centering on a candidate pixel that has already been found is set as a search area in the present embodiment, whereby a situation in which a plurality of candidate pixels are extracted based on the same disturbance object is prevented. Accordingly, it suffices to use, as the size of the predetermined area, the expected maximum size of the disturbance objects to be removed or a size yielded by providing a predetermined margin to the maximum size, for example.

Reference is made to FIG. 3 once again. In S305, the calculation unit 152, for each of the predetermined number of candidate pixels having been extracted from the distance image F(n) in S302, specifies a corresponding candidate pixel in the distance image F(n−1) of the previous frame, and calculates a feature value by using the corresponding candidate pixels (S305).

In the example illustrated in FIG. 4, candidate pixels P1(n), P2(n), P3(n) have been extracted with respect to the distance image F(n), and candidate pixels P1(n−1), P2(n−1), P3(n−1) have been extracted with respect to the distance image F(n−1).

In this case, for the candidate pixel P1(n), the calculation unit 152 extracts, as the corresponding candidate pixel, the candidate pixel P1(n−1) that is closest in terms of the position on the distance image among the candidate pixels P1(n−1), P2(n−1), P3(n−1) having been extracted in the distance image F(n−1). Similarly, the calculation unit 152 associates the candidate pixel P2(n−1) with respect to the candidate pixel P2(n), and associates the candidate pixel P3(n−1) with respect to the candidate pixel P3(n). Each pixel constituting a distance image is expressed by using three components, i.e., X and Y components indicating the position on the distance image and a Z component (depth component) indicating the distance to the object. Accordingly, it suffices for the calculation unit 152 to associate ones of the candidate pixels positions of which indicated by the X and Y components are close to one another.

Here, candidate pixels that are closest in terms of position on the distance images are associated with one another on the basis of the idea that both of such candidate pixels represent the same disturbance object. Accordingly, the same single disturbance object can be tracked until the disturbance object becomes out-of-frame by associating candidate pixels with one another over a plurality of frames.

Note that disturbance objects, such as rain, that move at such a high speed that the disturbance objects travel past within time corresponding to one frame cannot be tracked with the approach in the present embodiment. However, when the approach in the present embodiment is applied to such high-speed disturbance objects, different disturbance objects would be associated with one another and movement would become complex, whereby feature values that are large enough compared to the target objects to be recognized are yielded. Due to this, disturbance objects travelling at high speed can also be accurately detected with the approach in the present embodiment.

Figure 5:
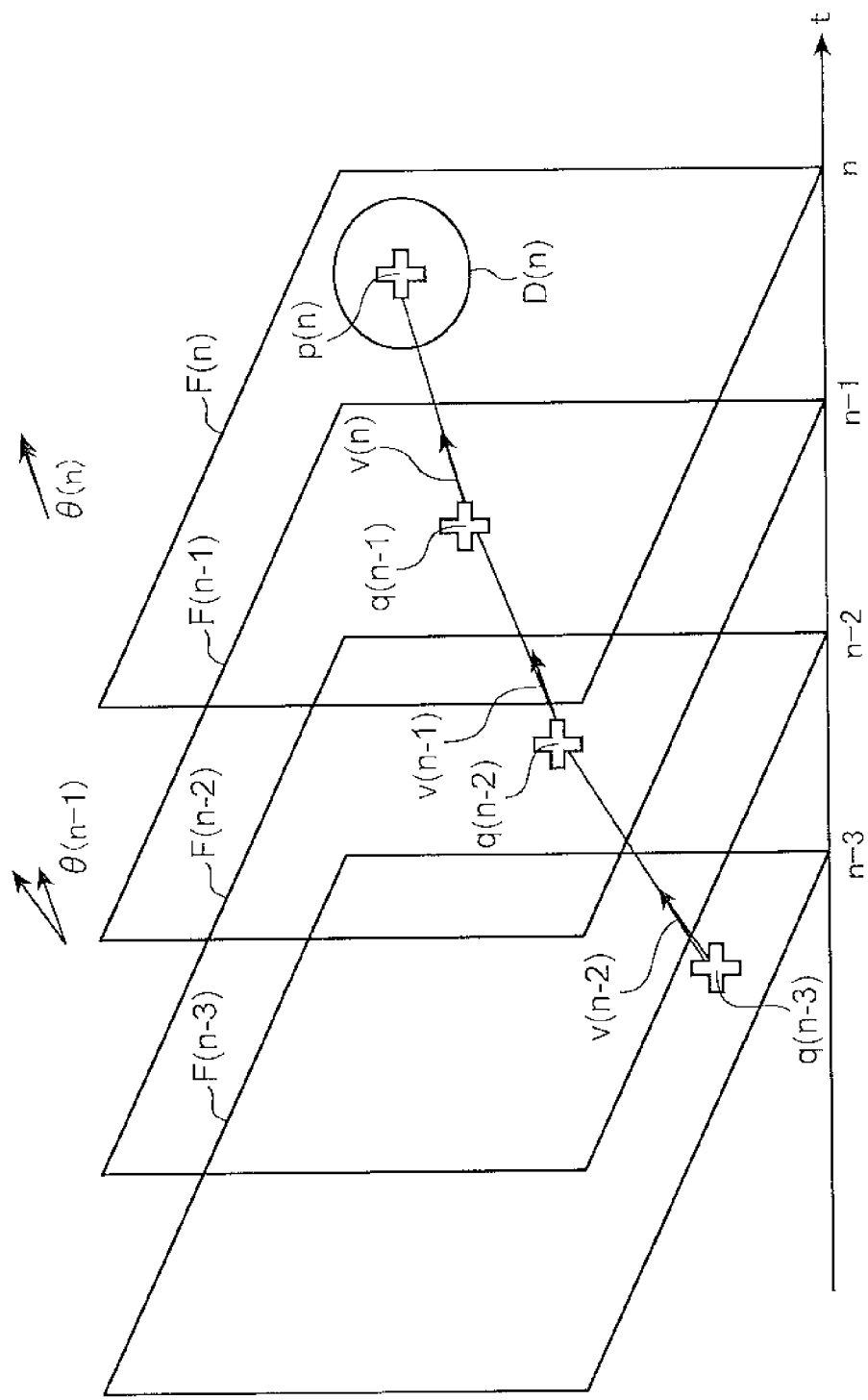
FIG. 5 is a diagram for describing the processing of calculating a feature value.

FIG. 5 is a diagram for describing the processing of calculating a feature value. As illustrated in FIG. 5, a given candidate pixel p(n) in the distance image F(n) is associated with a candidate pixel q(n−1) which is closest in position among the candidate pixels having been extracted in the distance image F(n−1). Further, the candidate pixel q(n−1) is associated with a candidate pixel q(n−2) which is closest in position among the candidate pixels having been extracted in the distance image F(n−2). Further, the candidate pixel q(n−2) is associated with a candidate pixel q(n−3) which is closest in position among the candidate pixels having been extracted in the distance image F(n−3).

Further, a feature value is calculated by using a sequence of candidate pixels having been associated in such a manner. In the present embodiment, a disturbance pixel is determined by calculating a feature value of velocity, angle, or acceleration by using a sequence of associated candidate pixels. In the following, the processing in and following S305 is described separately for a case in which a feature value of velocity is used, a case in which a feature value of angle is used, and a case in which a feature value of acceleration is used.

[Velocity]

In the example illustrated in FIG. 5, the velocities v(n), v(n−1), v(n−2) are calculated according to the following formulas.

$$v(n)=p(n)-q(n-1)$$

$$v(n-1)=q(n-1)-q(n-2)$$

$$v(n-2)=q(n-2)-q(n-3) \quad \text{Math (1)}$$

The velocities v(n), v(n−1), v(n−2) respectively indicate the velocities at distance images F(n), F(n−1), F(n−2). In the following description, with regard to velocities and accelerations, physical values to which lowercase reference symbols are appended indicate vectors, and physical values to which uppercase reference symbols are appended indicate scalars.

The pixels p(n), q(n−1), q(n−2), q(n−3) are candidate pixels associated across the distance images F(n), F(n−1), F(n−2), F(n−3), and each are three-dimensional data constituted of the X, Y, and Z components. Accordingly, the velocities v(n), v(n−1), v(n−2) are three-dimensional data (three-dimensional vectors).

The calculation unit 152 calculates a velocity Vi by using the velocity v(n) (S305). The velocity Vi can be expressed by using Math (2).

$$Vi=\|vi\| \quad \text{Math (2)}$$

Here, the velocity v(n) can be used as the velocity vi, and the three-dimensional Euclidean distance of the velocity vi can be used as the velocity Vi. Note that in Math (2), the velocity vi inside the norm symbol at the right side is a vector, and the velocity Vi is a scalar. Here, the velocity v(n) is used as the velocity vi, but this is one example. Alternatively, an average of velocities of the current and past frames, such as v(n) and v(n−1), may be used. In this case, an average of velocities that are not chronologically continuous, such as v(n) and v(n−2), may be used.

Next, the removal unit 153 determines whether or not the candidate pixel p(n) is a disturbance pixel on the basis of whether or not the velocity Vi exceeds a predetermined reference velocity Vmax (one example of the reference feature value) (S306). Further, when the velocity Vi exceeds the reference velocity Vmax having been set in advance, the removal unit 153 determines the candidate pixel p(n) as a disturbance pixel, removes the candidate pixel p(n) from the distance image F(n) (S307), and returns the processing to S301. Meanwhile, when the velocity Vi does net exceed the reference velocity Vmax, the removal unit 153 does not remove the candidate pixel p(n).

Here, as the reference velocity Vmax, the expected maximum velocity of the target objects to be recognized (people and the work machine 4), or a velocity yielded by adding a predetermined margin to the maximum velocity, for example, can be used. In this manner, even if the target object is extracted as a candidate pixel, the velocity Vi would fall below the reference velocity Vmax, and thus, a situation in which this candidate pixel is removed as a disturbance pixel can be prevented.

Here, as the reference velocity Vmax, the expected maximum velocity of people and the work machine 4 is used, but this is one example. It suffices to set the reference velocity Vmax in accordance with the target objects to be recognized. Further, when removing a candidate pixel p(n) having been determined as a disturbance pixel, it suffices for the removal unit 153 to remove a predetermined area D(n) including the candidate pixel p(n) from the distance image F(n). Accordingly, a situation in which a part of the same single disturbance object: remains unremoved can be prevented. This similarly applies to the later-described cases in which angle and acceleration are used.

Further, while FIG. 5 illustrates the processing with respect to the candidate pixel p(n), the same processing is performed with respect to other candidate pixels p(n) and the determination of whether or not the candidate pixels p(n) are disturbance pixels is performed.

Disturbance objects such as rain drops fall at high speed compared to people and the work machine 4. Accordingly, the approach of removing disturbance objects by using velocity is effective for removing disturbance objects such as rain drops.

[Angle]

In the example illustrated in FIG. 5, the angles θ(n) and θ(n−1) are calculated according to the following formulas.

$$\theta(n)\angle(v(n), v(n-1))$$

$$\theta(n-1)-\angle(v(n-1), v(n-2)) \quad \text{Math (3)}$$

The angle θ(n) indicates the angle between the vectors at velocity v(n) and velocity v(n−1).

The calculation unit 152 calculates the angle θ(n) as a feature value of angle (S305).

Next, the removal unit 153 determines whether or not the candidate pixel p(n) is a disturbance pixel on the basis of whether or not the angle θ(n) exceeds a reference angle θmax (one example of the reference feature value) (S306). Further, when the angle θ(n) exceeds the reference angle θmax, the removal unit 153 determines the candidate pixel p(n) as a disturbance pixel, removes the candidate pixel p(n) from the distance image F(n) (S307), and returns the processing to S301. Meanwhile, when the angle θ(n) does not exceed the reference angle θmax, the removal unit 153 does not remove the candidate pixel p(n).

Here, as the reference angle θmax, the maximum angle θ(n) expected when the target objects (the work machine 4 and people) are measured by using the distance measurement sensors 16 and angles θ(n) are calculated, or an angle yielded by adding a predetermined margin to the maximum angle θ(n), for example, can be used. Accordingly, even if the target object is extracted as a candidate pixel, the angle θ(n) would fall below the reference angle θmax, and thus, a situation in which this candidate pixel is removed as a disturbance pixel can be prevented.

Disturbance objects such as insects and snow tend to change directions rapidly. Accordingly, the approach of removing disturbance pixels by using the angle θ(n) is effective for removing disturbance objects such as insects and snow.

[Acceleration]

In the example illustrated in FIG. 5, accelerations a(n) and a(n−1) are calculated according to the following formulas.

$$a(n)=v(n)-v(n-1)$$

$$a(n-1)=v(n-1)-v(n-2) \quad \text{Math (4)}$$

Here, a(n) indicates the acceleration at the distance image F(n), and a(n−1) indicates the acceleration at the distance image F(n−1).

The calculation unit 152 calculates an acceleration Ai by using the acceleration a(n). The acceleration Ai can be expressed by using Math (5).

$$Ai=\|ai\| \quad \text{Math (5)}$$

Here, the acceleration a(n) can be used as the acceleration ai, and the three-dimensional Euclidean distance of the acceleration ai can be used as the acceleration Ai. Note that in Math (5), the acceleration ai inside the norm symbol at the right side is a vector, and the acceleration Ai is a scalar. Here, the acceleration a(n) is used as the acceleration ai, but this is one example. Alternatively, an average of accelerations of the current and past frames, such as a(n) and a(n−1), may be used. In this case, an average of accelerations that are not chronologically continuous, such as a(n) and a(n−2), may be used.

Next, the removal unit 153 determines whether or not the candidate pixel p(n) is a disturbance pixel on the basis of whether or not the acceleration Ai exceeds a predetermined reference acceleration Amax (one example of the reference feature value) (S306). Further, when the acceleration Ai exceeds the reference acceleration Amax, the removal unit 153 determines the candidate pixel p(n) as a disturbance pixel, removes the candidate pixel p(n) from the distance image F(n) (S307), and returns the processing to S301. Meanwhile, when the acceleration Ai does not exceed the reference acceleration Amax, the removal unit 153 does not remove the candidate pixel p(n).

Here, as the reference acceleration Amax, the expected maximum acceleration of the target objects to be recognized (people and the work machine 4), or an acceleration yielded by adding a predetermined margin to the maximum acceleration, for example, can be used. In this manner, even if the target object is extracted as a candidate pixel, the acceleration Ai would fall below the reference acceleration Amax, and thus, a situation in which this candidate pixel is removed as a disturbance pixel can be prevented.

Here, as the reference acceleration Amax, the expected maximum acceleration of people and the work machine 4 is used, but this is one example. It suffices to set the reference acceleration Amax in accordance with the target objects to be recognized.

When the frame rate of the distance images is low, the calculation unit 152 may not be able to track disturbance objects in an appropriate manner. In such a case, the velocity v(n) of a disturbance object would be measured in a randomly-changing manner and a great acceleration a(n) would be measured. Meanwhile, due to the work machine 4 and people being slow in speed compared to disturbance objects, the calculation unit 152 can track the work machine 4 and people in an appropriate manner even if the frame rate is low. In such a case, a great acceleration a(n) is not measured. Accordingly, the approach of removing disturbance objects by using acceleration is effective when the frame rate is low and disturbance objects cannot be tracked in an appropriate manner.

Further, as mentioned in the [Angle] section, insects and snow show great changes in direction. Accordingly, when insects and snow are measured by using the distance measurement sensors 16, great accelerations can be measured. Accordingly, the approach of removing disturbance objects by using acceleration is also effective for insects and snow. Further, shot noise included in distance images also changes randomly, and thus, the approach of removing disturbance objects by using acceleration is also effective for shot noise.

[Combination]

In the description above, the approaches of removing disturbance objects by using velocity, angle, and acceleration are each used independently. However, these approaches may be used in combination. In this case, it suffices for the removal unit 153 to determine whether or not the candidate pixel p(n) is a disturbance pixel by using each of the approaches of velocity, angle, and acceleration, and to determine that the candidate pixel p(n) is a disturbance pixel when having determined that the candidate pixel p(n) is a disturbance pixel according to at least one of the approaches.

Alternatively, with respect to the candidate pixel p(n), the removal unit 153 may first determine whether or not the candidate pixel p(n) is a disturbance pixel by using the approach of velocity, may then determine whether or not the candidate pixel p(n) is a disturbance pixel by using the approach of angle when the candidate pixel p(n) could not be determined as a disturbance pixel using the approach of velocity, and then determine whether or not the candidate pixel p(n) is a disturbance pixel by using the approach of acceleration when the candidate pixel p(n) could not be determined as a disturbance pixel using the approach of angle.

[Modifications]

(1) In the description above, people and the work machine 4 are used as target objects to be recognized, but this is one example. When the disturbance removal device is applied to an automobile, it suffices to use people as the target objects to be recognized.

(2) In the description above, description is provided that the work machine 4 is stopped automatically when a target object has entered an automatic operation area. However, the traveling movement of the lower travelling body 2 or the slewing movement of the upper slowing body 3 may be automatically stopped. Further, instead of automatically stopping the work machine 4, the interference prevention unit 155 may restrict movement SO that the work machine 4 does not interfere with the main body part.

(3) In the present invention, the manner in which disturbance pixels are removed from a distance image includes a manner in which the disturbance pixels are not actually removed and are set as invalid pixels to be ignored by the interference determination unit 154 upon determination of the risk of interference.

The features of the embodiment described above can be summarized as follows.

A disturbance removal device according to one aspect to the present invention is a disturbance removal device that removes, from a distance image, a granular disturbance object flying around a target object to be recognized, the disturbance removal device including: a distance measurement sensor that chronologically acquires a plurality of distance images indicating a distance distribution of a surrounding environment; an extraction unit that, with respect to each distance image acquired by the distance measurement sensor, extracts a predetermined number of pixels in order of smaller distance as candidate pixels of the disturbance object, the predetermined number being one or more; a calculation unit that calculates a feature value the value of which increases with a greater degree of temporal change between each candidate pixel in a distance image of a current frame and a corresponding candidate pixel in a distance image of a past frame; and a removal unit that specifics, as a pixel indicating the disturbance object, a candidate pixel the feature value of which calculated by the calculation unit is larger than a predetermined reference feature value, and removes the specified pixel from the distance image of the current frame.

In the present aspect, from a distance image, a predetermined number of pixels are extracted in the order of smaller distance as candidate pixels of the disturbance object, the predetermined number being one or more, and a candidate pixel the feature value of which, indicating a characteristic of a temporal change, is larger than the predetermined reference feature value is specified as a pixel indicating the disturbance object and is removed from the distance image of the current frame. Due to this, seen from the distance measurement sensor, a granular disturbance object flying at a position that is closer thereto than the target object can be removed from the distance image.

In the above-described aspect, the calculation unit may calculate, as the feature value, a velocity indicating a temporal change in position between each candidate pixel in the distance image of the current frame and the corresponding candidate pixel in the distance image of the past frame.

According to the present aspect, a granular minute object flying at high speed, such as a rain drop, can be accurately removed as the disturbance object.

In the above-described aspect, the calculation unit may calculate, as the feature value, an angle between a velocity vector of each candidate pixel in the distance image of the current frame and a velocity vector of the corresponding candidate pixel in the distance image of the past frame.

According to this aspect, a granular minute object, such as an insect or snow, the flying direction of which changes more rapidly than the target object can be accurately removed as the disturbance object.

In the above-described aspect, the calculation unit may calculate, as the feature value, an acceleration indicating a temporal change in velocity between each candidate pixel in the distance image of the current frame and the corresponding candidate pixel in the distance image of the past frame.

According to the present aspect, shot noise occurring at the distance measurement sensor, in addition to a granular minute object, such as snow or an insect, the change in velocity of which is large compared to the target object, can also be accurately removed as the disturbance object.

In the above-described aspect, the calculation unit may calculate, as the feature value, each of a velocity indicating a temporal change in position, an angle between velocity vectors, and an acceleration indicating a temporal change in the velocity between each candidate pixel in the distance image of the current frame and the corresponding candidate pixel in the distance image of the past frame, the reference feature value may include reference feature values corresponding to the velocity, the angle, and the acceleration, and the removal unit may remove, from the distance image of the current frame, a candidate pixel of which at least one of the velocity, the angle, and the acceleration is larger than the corresponding feature value as a pixel indicating the disturbance object.

According to the present aspect, a candidate pixel of which at least one of velocity, velocity vector angle, and acceleration is larger than the corresponding reference feature value is removed as a pixel indicating the disturbance object, whereby the detection accuracy of the disturbance object can be improved.

In the above-described aspect, the extraction unit may extract the predetermined number of candidate pixels by repeating, with respect to the distance image of the current frame for a predetermined number of times, processing of setting a search area by removing a predetermined area including an extracted candidate pixel and extracting a pixel having smallest distance from the search area having been set.

According to the present aspect, candidate pixels are extracted by repeating processing of extracting the pixel having the smallest distance from a search area yielded by removing a predetermined area centering on an extracted candidate pixel, whereby a situation in which a plurality of candidate pixels are extracted for the same single disturbance object can be prevented.

In the above-described aspect, the target object may be a work machine which is included in a construction machine and a posture of which is changeable, and the reference feature value may be set based on a velocity larger than an expected maximum velocity of the work machine.

According to the present aspect, the reference feature value is set based on a velocity larger than the expected maximum velocity of the work machine, whereby a situation in which a pixel indicating the work machine is removed as the disturbance object can be avoided.

In the above-described aspect, the target object may be a work machine which is included in a construction machine and a posture of which is changeable, and the reference feature value may be set based on an angle greater than an expected maximum amount of change in angle of the work machine.

According to the present aspect, the reference feature value is set based on an angle greater than the expected maximum amount of change in angle of the work machine, whereby a situation in which a pixel indicating the work machine is removed as the disturbance object can be avoided.

In the above-described aspect, the target object may be a work machine which is included in a construction machine and a posture of which is changeable, and the reference feature value may be set based on an acceleration greater than an expected maximum acceleration of the work machine.

According to the present aspect, the reference feature value is set based on an acceleration greater than the expected maximum acceleration of the work machine, whereby a situation in which a pixel indicating the work machine is removed as the disturbance object can be avoided.

In the above-described aspect, the disturbance object may be constituted of a minute object including at least one of rain, snow, and an insect.

According to the present aspect, a minute object such as rain, snow, or an insect can be removed as the disturbance object.

In the above-described aspect, the disturbance removal device may be applied to a construction machine including: a main body part; and a work machine a posture of which relative to the main body part is changeable, and the disturbance removal device may further include: an interference determination unit that recognizes the work machine as the target object in a distance image from which the disturbance object has been removed and determines that there is a risk of the target object interfering with the main body part when the recognized target object is located within a predetermined distance range with respect to the main body part; and
an interference prevention unit that, when the interference determination unit determines that there is a risk of interference, performs at least one of restriction of movement of the work machine and issuance of a warning.

According to the present aspect, the risk of interference is determined by recognizing the target object by using a distance image from which the disturbance object has been removed, whereby a situation in which unnecessary restrictions of movement and issuance of warnings are frequently carried out can be prevented.

The invention claimed is:

1. A disturbance removal device that removes, from a distance image, a granular disturbance object flying around a target object to be recognized, the disturbance removal device comprising:
a distance measurement sensor that chronologically acquires a plurality of distance images indicating a distance distribution of a surrounding environment;
an extraction unit that, with respect to each distance image acquired by the distance measurement sensor, extracts a predetermined number of pixels in order of smaller distance as candidate pixels of the disturbance object, the predetermined number being one or more;
a calculation unit that calculates a feature value the value of which increases with a greater degree of temporal change between each candidate pixel in a distance image of a current frame and a corresponding candidate pixel in a distance image of a past frame; and
a removal unit that specifies, as a pixel indicating the disturbance object, a candidate pixel, the feature value of which calculated by the calculation unit is larger than a predetermined reference feature value, and removes the specified pixel from the distance image of the current frame.

2. The disturbance removal device according to claim 1, wherein the calculation unit calculates, as the feature value, a velocity indicating a temporal change in position between each candidate pixel in the distance image of the current frame and the corresponding candidate pixel in the distance image of the past frame.

3. The disturbance removal device according to claim 1, wherein the calculation unit calculates, as the feature value, an angle between a velocity vector of each candidate pixel in the distance image of the current frame and a velocity vector of the corresponding candidate pixel in the distance image of the past frame.

4. The disturbance removal device according to claim 1, wherein the calculation unit calculates, as the feature value, an acceleration indicating a temporal change in velocity between each candidate pixel in the distance image of the current frame and the corresponding candidate pixel in the distance image of the past frame.

5. The disturbance removal device according to claim 1, wherein
the calculation unit calculates, as the feature value, each of a velocity indicating a temporal change in position, an angle between velocity vectors, and an acceleration indicating a temporal change in the velocity between each candidate pixel in the distance image of the current frame and the corresponding candidate pixel in the distance image of the past frame,
the reference feature value includes reference feature values corresponding to the velocity, the angle, and the acceleration, and
the removal unit removes, from the distance image of the current frame, a candidate pixel of which at least one of the velocity, the angle, and the acceleration is larger than the corresponding reference feature value as a pixel indicating the disturbance object.

6. The disturbance removal device according to claim 1, wherein the extraction unit extracts the predetermined number of candidate pixels by repeating, with respect to the distance image of the current frame for a predetermined number of times, processing of setting a search area by removing a predetermined area including an extracted candidate pixel and extracting a pixel having smallest distance from the search area having been set.

7. The disturbance removal device according to claim 1, wherein
the target object is a work machine which is included in a construction machine and a posture of which is changeable, and
the reference feature value is set based on a velocity larger than an expected maximum velocity of the work machine.

8. The disturbance removal device according to claim 1, wherein
the target object is a work machine which is included in a construction machine and a posture of which is changeable, and
the reference feature value is set based on an angle greater than an expected maximum amount of change in angle of the work machine.

9. The disturbance removal device according to claim 1, wherein
the target object is a work machine which is included in a construction machine and a posture of which is changeable, and
the reference feature value is set based on an acceleration greater than an expected maximum acceleration of the work machine.

10. The disturbance removal device according to claim 1, wherein the disturbance object is constituted of a minute object including at least one of rain, snow, and an insect.

11. The disturbance removal device according to claim 1, wherein
the disturbance removal device is applied to a construction machine including: a main body part; and a work machine, a posture of which relative to the main body part is changeable, and
the disturbance removal device further comprises:
an interference determination unit that recognizes the work machine as the target object in a distance image from which the disturbance object has been removed and determines that there is a risk of the target object interfering with the main body part when the recognized target object is located within a predetermined distance range with respect to the main body part; and
an interference prevention unit that, when the interference determination unit determines that there is a risk of interference, performs at least one of restriction of movement of the work machine and issuance of a warning.

* * * * *